(12) United States Patent
Imafuku et al.

(10) Patent No.: US 7,460,301 B2
(45) Date of Patent: Dec. 2, 2008

(54) IMAGE DISPLAY APPARATUS, AND TRANSMISSIVE SCREEN AND REFLECTING MIRROR USED FOR SAME

(75) Inventors: Daisuke Imafuku, Fujisawa (JP); Hiroki Yoshikawa, Hiratsuka (JP); Tetsu Ohishi, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 282 days.

(21) Appl. No.: 11/062,742

(22) Filed: Feb. 23, 2005

(65) Prior Publication Data
US 2006/0092510 A1    May 4, 2006

(30) Foreign Application Priority Data
Oct. 29, 2004    (JP)    ............ 2004-315002

(51) Int. Cl.
G03B 21/56    (2006.01)
G03B 21/60    (2006.01)
G02B 3/08    (2006.01)

(52) U.S. Cl. ........................ 359/460; 359/457; 359/454; 359/742

(58) Field of Classification Search ................. 359/460, 359/443, 457, 454, 742
See application file for complete search history.

(56) References Cited

U.S. PATENT DOCUMENTS 5,100,222 A * 3/1992 Minoura et al. ............. 359/455
5,274,406 A 12/1993 Tejima et al.
6,407,860 B1 * 6/2002 Funazaki et al. ............ 359/457
6,624,934 B1 * 9/2003 Moshrefzadeh et al. ..... 359/457
6,989,929 B2 * 1/2006 Watanabe ................... 359/457

FOREIGN PATENT DOCUMENTS

| JP | 06-027535 | 2/1994 |
| JP | 2000-131510 | 5/2000 |
| JP | 2003-005294 | 1/2003 |

* cited by examiner

Primary Examiner—Diane I. Lee
Assistant Examiner—Magda Cruz
(74) Attorney, Agent, or Firm—McDermott Will & Emery LLP (57) ABSTRACT

The present invention provides a technique suitable for making a set more compact by realizing reduction in height and reduction in depth. An image display apparatus of the present invention includes a reflecting mirror (4) for reflecting the image sent from a projection lens (2), and guiding the image to a transmissive screen (3). The reflecting-mirror (4) includes a planar mirror section (4a) for reflecting, of the entire image exiting the projection lens (2), only image portions projected onto the upper section of the transmissive screen (3), and a Fresnel mirror section (4b) with multiple reflective prisms for reflecting only image portions projected onto the lower section of the screen (3).

4 Claims, 8 Drawing Sheets

IMAGE DISPLAY APPARATUS, AND TRANSMISSIVE SCREEN AND REFLECTING MIRROR USED FOR SAME

CLAIM OF PRIORITY

The present application claims priority from Japanese Application serial no. JP 2004-315002 filed on Oct. 29, 2004, the content of which is hereby incorporated by reference into this application.

BACKGROUND OF THE INVENTION (1) Field of the Invention

The present invention relates to a technique for making more compact an image display apparatus that displays incoming images formed by an image generation source in enlarged and projected form on a transmissive screen.

(2) Description of the Related Art

A projection-type image display apparatus (hereinafter, the apparatus may also be called "set") enlarges, via a projection lens or the like, the image displayed on the element operating as a small-size image generation source such as projection-type cathode-ray tube or liquid-crystal display element, and forms this image on a transmissive screen by projecting the image thereonto.

Such an image display apparatus is required to be thinned down (reduced in depth of the set) to reduce its weight, costs, and installation space. Examples of known transmissive-screen configurations applicable to a thinned-down set include the one described in Japanese Patent Laid-Open No. Hei 6-27535 (Patent Reference 1). Also, examples of known mirror configurations applicable to a thinned-down set include the one described in U.S. Pat. No. 5,274,406 (Patent Reference 2).

SUMMARY OF THE INVENTION

Although the configurations described in above Patent References 1 and 2 may be valid for reducing the thickness of a set, neither of the configurations allows for reduction in height of the set. That is to say, the configurations described in Patent References 1 and 2 do not allow for making the entire set more compact by thinning down the set while reducing its height.

Figure 1:
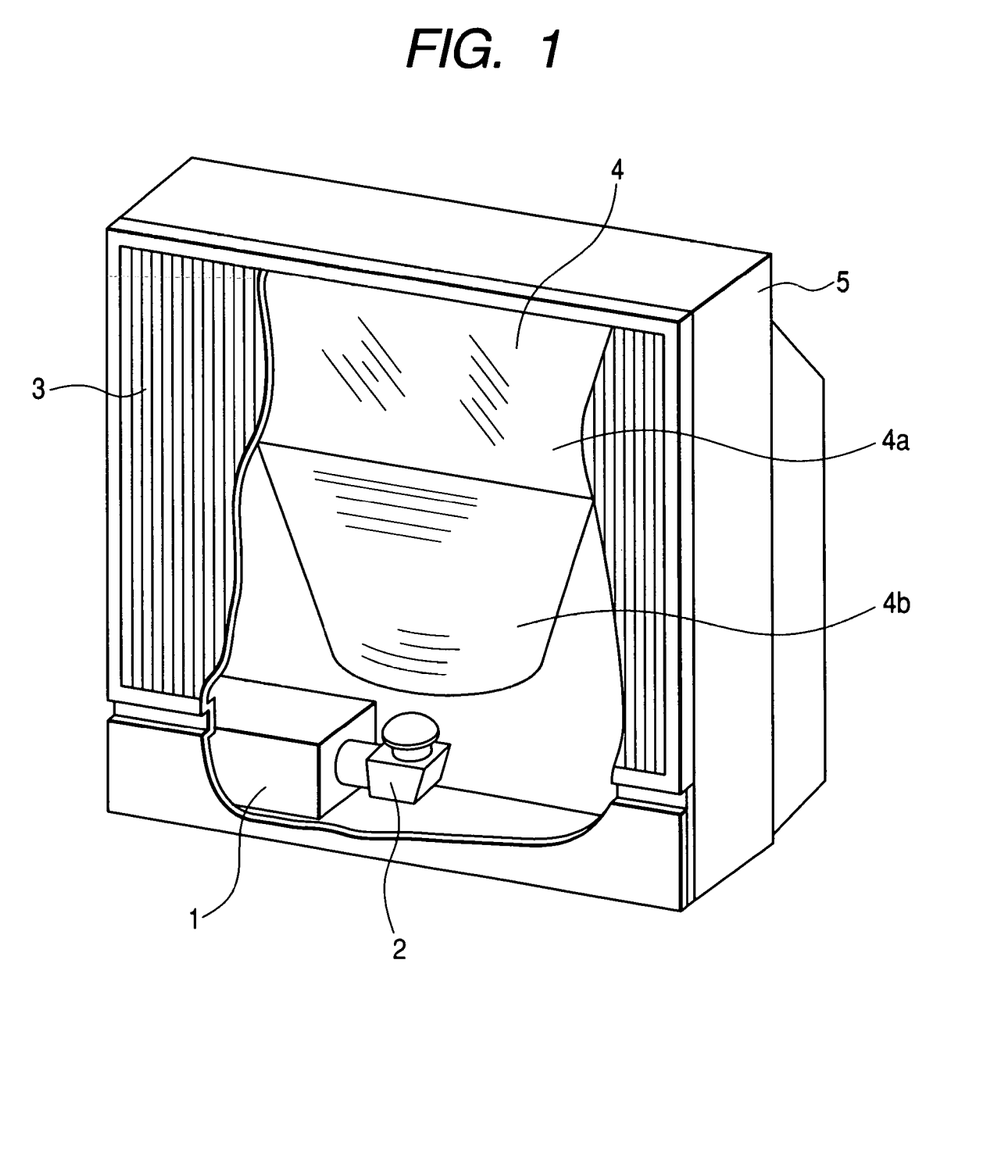
FIG. 1 is a view showing an image display apparatus as an embodiment of the present invention.

It becomes possible to thin down a set by shifting the optical-axis center of a projection lens from the center of a transmissive screen. In this configuration, however, the set increases in height, as shown in FIG. 1 of Patent Reference 1 or FIG. 1 of Patent Reference 2. To reduce the height of the set, it is valid to use a wider-angle projection lens and shorten its projection distance, which makes the set difficult to reduce in thickness; however. In other words, reducing the height of the set and thinning it down are contradictory to each other, and realizing both at the same time becomes important for making the set more compact (thinning down the set while reducing it in height).

In addition, when the mirror described in Patent Reference 2 is used as a reflecting mirror, the incident angles of the beams of light that are reflected from the reflecting mirror may differ in the same circumferential region of a Fresnel lens. In this case, it is difficult, by using a Fresnel lens, to change the reflected beams into parallel beams (i.e., light approximately parallel to the optical axis of the Fresnel lens). Accordingly, depending on the particular position of the incoming light, outgoing light from the Fresnel lens may face too inward or too outward, resulting in image deterioration. If a non-planar mirror is used as the reflecting mirror, therefore, preventing image deterioration due to the nonuniformity of the incident angle of the reflected light entering the Fresnel lens becomes one of important factors in making the set more compact.

The present invention has been made in view of the above problems, and an object of the invention is to provide a technique suitable for making a set more compact. The present invention provides the following technique suitable for making an image display apparatus more compact:

(1). Transmissive Screen:

A transmissive screen according to the present invention has the following features. That is, the invention shifts a center of a concentric refractive prism (Fresnel lens) formed on a Fresnel lens sheet, to a physical central position of a screen and makes a prism angle of the concentric prism differ within the same circumferential region. For example, a prism angle of a prism present on a line segment connecting the center of the prism and four corners of the Fresnel lens sheet is made greater than a prism angle of a prism present on a vertical line segment passing through the center of the above prism. In addition, if an approximately elliptical reference line is drawn on the Fresnel lens sheet, substantially the same required prism angle may be given to a prism present on the reference line. Furthermore, a prism angle of a prism present internally to the reference line may be made smaller than the above required prism angle, and a prism angle of a prism present externally to the reference line may be made greater than the above required prism angle.

(2) Set Configuration:

An image display apparatus according to the present invention has the following features. That is, in the invention, a mirror for reflecting the image enlarged by a projection lens, and guiding the image to a transmissive screen, uses a first mirror section to reflect a first portion of the image exiting the projection lens, and a second mirror section to reflect a second portion of the image exiting the projection lens. In other words, the first mirror section reflects, of the entire image sent from the projection lens, only an image portion associated with an upper section of the transmissive screen, whereas the second mirror section reflects, of the entire image sent from the projection lens, only an image portion associated with a lower section of the transmissive screen. The above first and second mirror sections are bonded to each other, the second mirror section is installed on a back face of an enclosure which accommodates the set, and the first mirror section is installed above the second mirror section. The first mirror section may be installed inclinedly to the second mirror section so that a reflecting surface of the first mirror section faces downward.

(3) Reflecting Mirror:

A reflecting mirror according to the present invention has the following features. That is, the invention constructs the reflecting mirror by using a planar mirror section and a Fresnel mirror section whose reflection surface has a Fresnel shape (i.e., a shape in which multiple reflective prisms extending in a horizontal direction are arrayed in a vertical direction). A reflection surface of the Fresnel mirror section is convex with respect to a direction in which light is reflected from the reflection surface. The above planar mirror section and Fresnel mirror section are bonded to each other, and the first side of the Fresnel mirror section that abuts a planar mirror thereof is linear. Also, the second side of the Fresnel mirror section that is disposed at a position opposite to that of the above first side is curved to be convex with respect to a reflecting direction of light.

According to the above configuration of the present invention, it can be realized to make a set more compact.

DETAILED DESCRIPTION OF THE PREFERRED EMBODIMENT

An embodiment of the present invention will be described hereunder with reference to the accompanying drawings. FIG. 1 is a partially sectional perspective view of an image display apparatus according to the present invention. An image generation source 1 is constructed of a projection-type cathode-ray tube or a reflective/transmissive liquid-crystal panel, an image modulation element such as a display element having a plurality of very small mirrors, and other elements. The image generation source 1 displays a compact image on its display surface according to a particular signal level of an input video signal. A projection lens 2 projects the image displayed by the image generation source 1, onto a transmissive screen 3. Since the projection lens 2 is usually long in projection distance, a reflecting mirror 4 is provided halfway on an optical path between the projection lens 2 and the transmissive screen in order to reduce a depth of the set. The projected image from the projection lens 2 is reflected by the reflecting mirror 4 and guided to the transmissive screen 3. The reflecting mirror 4 according to the present embodiment includes, as a first mirror section, a planar mirror section 4a having a planar reflection surface, and as a second mirror section, a Fresnel mirror section 4b. The Fresnel mirror section 4b has its reflection surface formed into a Fresnel shape. That is to say, on the reflection surface of the Fresnel mirror section 4b, a plurality of reflective prisms extending in a horizontal (lateral width) direction of the set are arranged in line in a vertical (height) direction of the set. The image generation source 1, the projection lens 2, and the reflecting mirror 4 are accommodated inside an enclosure 5 and fixed in place within the enclosure 5. The transmissive screen 3 is fixed to a front section of the enclosure 5 and forms the image at the image-viewing side of the screen 3.

Figure 2:
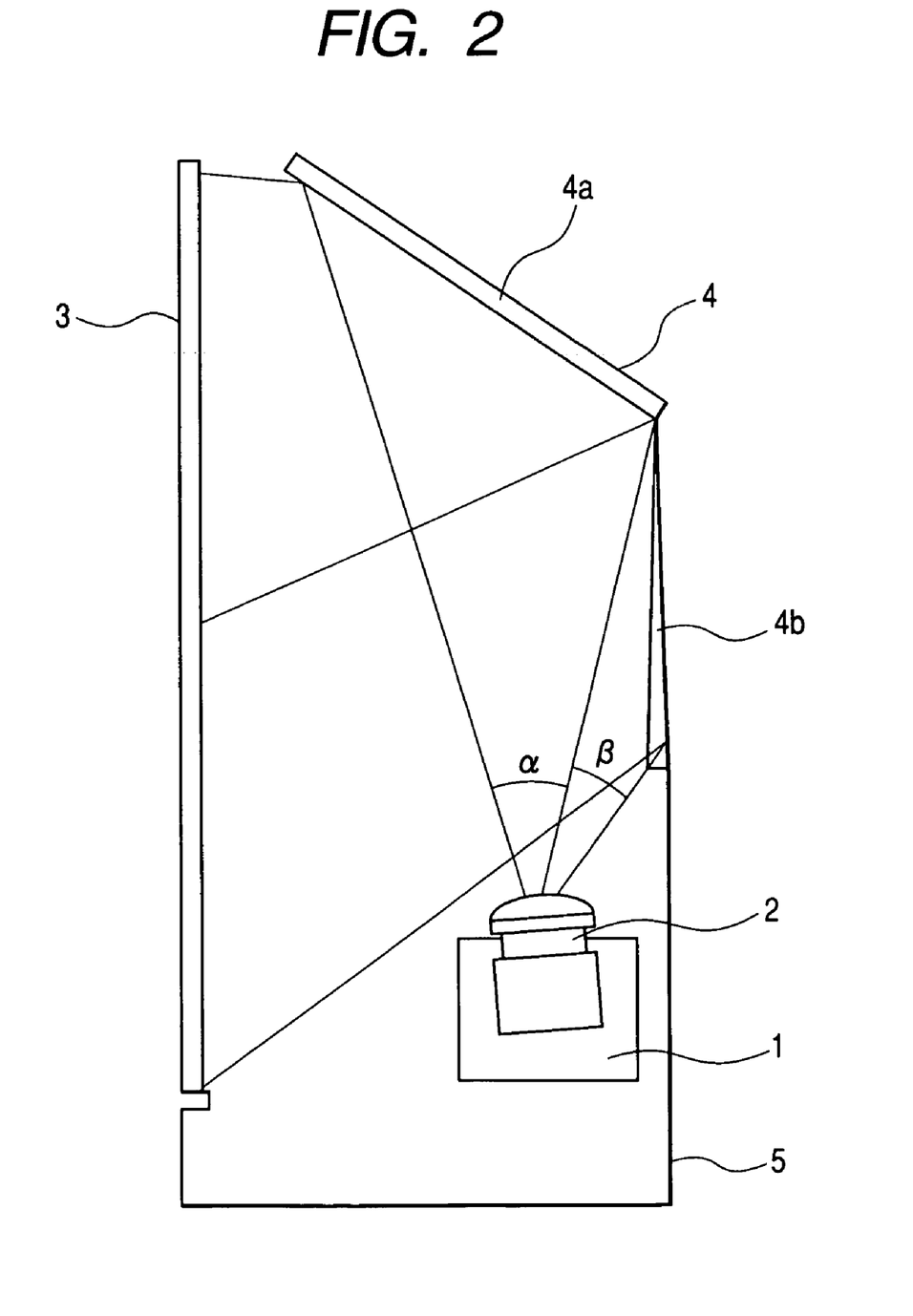
FIG. 2 is a longitudinal sectional view of the image display apparatus according to the present invention.
Figure 4:
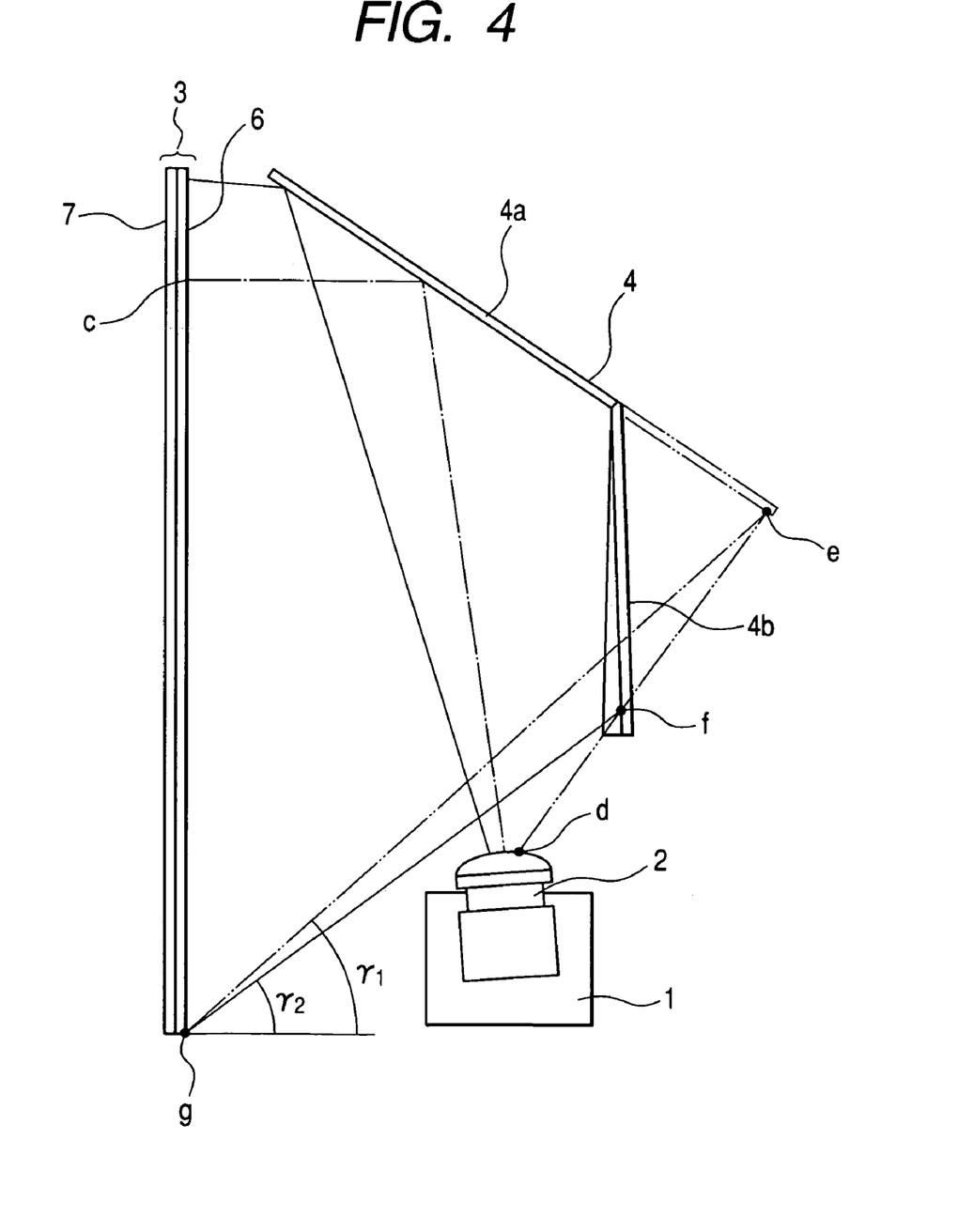
FIG. 4 is another longitudinal sectional view of the image display apparatus, shown for comparison with the set used in the related art.

FIG. 2 is a view that shows a longitudinal section passing through a horizontal center of the image display apparatus according to the present invention. As shown in FIG. 4, the transmissive screen 3 has a Fresnel lens sheet 6 on which a plurality of concentric Fresnel lenses are formed at the image-viewing side, and a diffusion sheet 7 disposed at the image-viewing side of the Fresnel lens sheet 6. At the Fresnel lens sheet 6, the beams of light that have reflected from the reflecting mirror 4 are made into parallel beams (light parallel to an optical axis of each Fresnel lens). The diffusion sheet 7 includes optical elements such as a lenticular lens, or a light-diffusing agent or the like, and diffuses in a horizontal direction the light that has transmitted the Fresnel lens sheet 6. The planar mirror section 4a and the Fresnel mirror section 4b are arranged vertically in a mutually bonded condition. Also, the Fresnel mirror section 4b is installed internally on a back face of the enclosure 5, and a principal plane of this mirror section is substantially parallel to the back face of the enclosure 5. The planar mirror section 4a of the reflecting mirror 4 is positioned above the Fresnel mirror section 4b. Also, the planar mirror section 4a is installed inclinedly to the Fresnel mirror section 4b so that the reflection surface of the planar mirror section 4a faces downward. In the present embodiment, the planar mirror section 4a is installed inside an inclined top plate of the enclosure 5. The reflective prisms formed on the reflection surface of the Fresnel mirror section 4b are very small, and are thus not shown in FIG. 2.

The display image formed by the image generation source 1 is enlarged by the projection lens 2 and then projected onto the transmissive screen 3 via the reflecting mirror 4. In the present embodiment, among all the projected image light from the projection lens 2, only a first part within a range of angle α is reflected by the planar mirror section 4a and projected onto the transmissive screen 3. Meanwhile, a second part of the projected image light, within a range of angle β, is reflected by the planar mirror section 4a and projected onto the transmissive screen 3. Light of the image displayed on an upper section of the display surface of the image generation source 1 is included in the above range of angle α. In other words, the above range of angle α includes the image light projected onto an upper section (approximately an upper half) of the transmissive screen 3, and the image light at this upper section is reflected by the planar mirror section 4a and guided to the transmissive screen 3. Also, light of the image displayed on a lower section of the display surface of the image generation source 1 is included in the above range of angle β. In other words, the above range of angle β includes the image light projected onto a lower section (approximately lower half) of the transmissive screen 3, and the image light at this upper section is reflected by the planar mirror section 4a and guided to the transmissive screen 3. In the present embodiment, an image is thus projected onto two different image display regions of the transmissive screen 3 by the reflecting mirror made up of two split sections. In the present embodiment, the image is projected onto an upper section of the set by the projection lens 2. Therefore, since the image portion in the range of angle α (i.e., the image portion projected onto the upper section of the transmissive screen 3) is projected onto the upper section of the set, the planar mirror section 4a is installed on the top plate of the enclosure 5. Also, since the image portion in the range of angle β (i.e., the image portion projected onto the lower section of the transmissive screen 3) is projected onto the back face of the set, the Fresnel mirror section 4b is installed on the back face of the enclosure 5. Thus, as shown in FIG. 2, height of a section below the transmissive screen 3 of the set (i.e., height of a pedestal section) can be reduced. This reduces the set in height and in depth, making the set more compact. A configuration of the Fresnel mirror section 4b is described in detail below using FIG. 3.

Figure 3A:
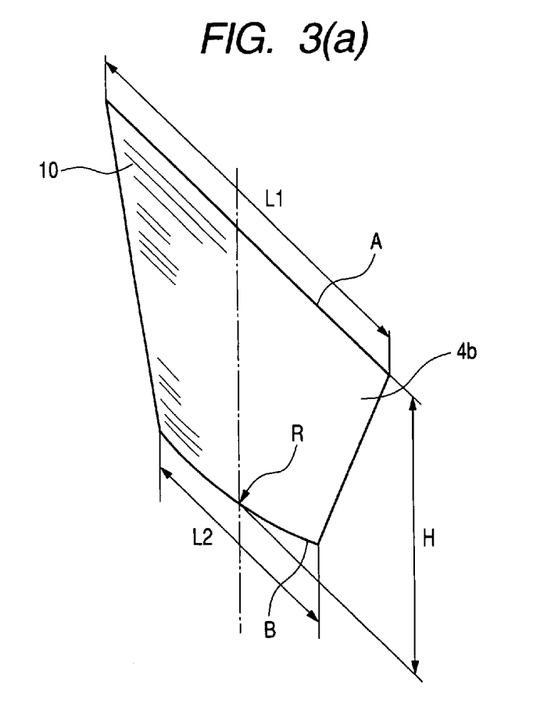
FIGS. 3A and 3B are external views of the Fresnel mirror section 4b used in the above embodiment.
Figure 3B:
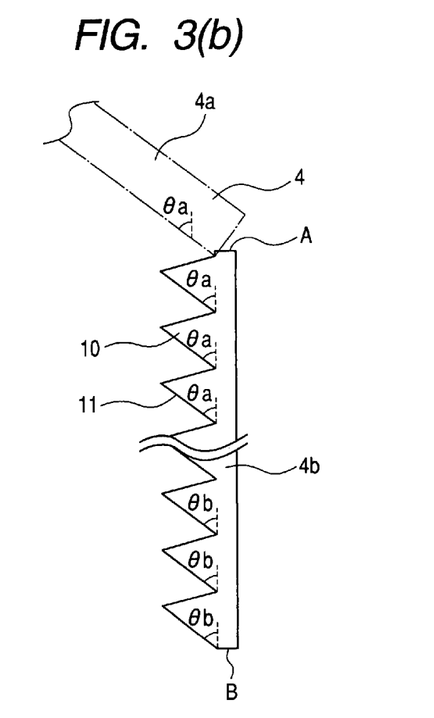

FIGS. 3A and 3B are external views of the Fresnel mirror section 4b used in the image display apparatus of the present invention. FIG. 3A is a perspective view of the entire Fresnel mirror section 4b, and FIG. 3B shows a longitudinal section passing through a horizontal center of the Fresnel mirror section 4b. In FIG. 3A, on the Fresnel mirror section 4b, a plurality of reflective prisms 10 extending in a horizontal direction are arranged in line in a vertical direction. Upper end A (first side) abutting the planar mirror section 4a (not shown) of the reflecting mirror 4 is of a linear shape. Lower end B (second side) opposite to the upper end A of the Fresnel mirror section 4b is curved to be convex with respect to a direction of the transmissive screen 3, namely, in a direction of the light reflected from the reflection surface. A lower region of the Fresnel mirror section 4b, therefore, has a curved surface with a convex facing toward the transmissive screen 3, namely, in the radiating direction of the light from the reflection surface. The above reflective prisms 10, as shown in FIG. 3B, are prism-shaped in section and have a Fresnel reflection surface 11 substantially parallel to the planar mirror section 4b. The image light projected downward by the projection lens 2 is guided to a lower section of the transmissive screen 3 by the Fresnel reflection surface 11. The Fresnel reflection surface 11 and the principal plane of the Fresnel mirror section 4b are constructed so that angles (θa, θb) formed by both decreases as the particular angled section is located closer to the lower end B. In other words, angles θa and θb take a relationship of θa>θb in FIG. 3B. Approximate dimensions of the Fresnel mirror section 4b in the present embodiment are as follows: for a screen with a diagonal size of 50 inches and an aspect ratio of 16:9, as shown in FIG. 3A, about 570 mm in length L1 of the upper end A, about 200 mm in length L2 of the lower end B, about 200 mm in height, and about 1,560 mm in radius-of-curvature, R, of the lower end.

Figure 5:
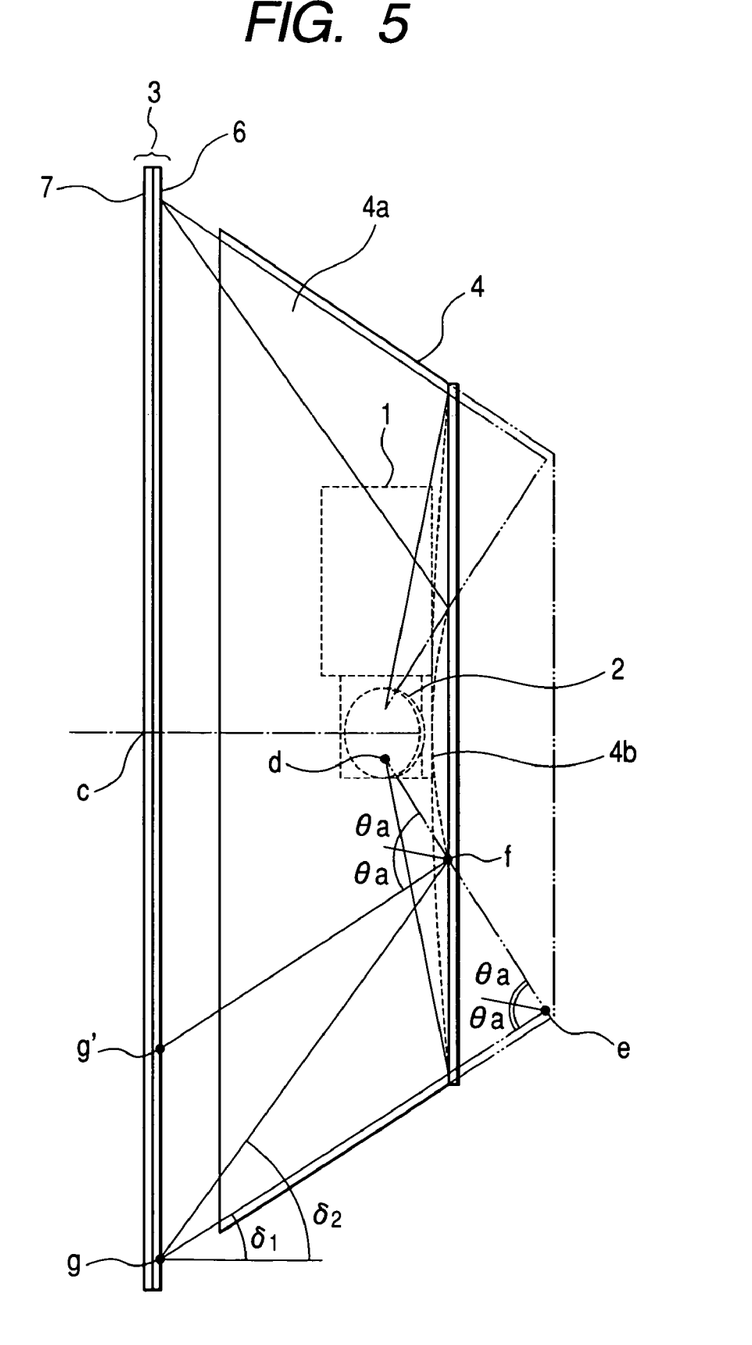
FIG. 5 is a cross-sectional view of the image display apparatus, shown for comparison with the set used in the related art.

How light is reflected by the Fresnel mirror section 4b will be described hereunder using FIGS. 4 and 5.

FIG. 4 is a longitudinal sectional view through a horizontal center of the image display apparatus according to the present embodiment, showing from a lateral direction an arrangement of optics inside the set. In FIG. 4, the arrangement according to the present embodiment is shown with solid lines, whereas, of all sections based on the related art, only those different from the present invention are each shown with a double-dot-dashed line. FIG. 5 shows a horizontal section of the image display apparatus, showing from an upward direction the arrangement of optics inside the set. As in FIG. 4, the arrangement according to the present embodiment is shown with solid lines, whereas, of all sections based on the related art, only those different from the present invention are each shown with a double-dot-dashed line. The configuration of the present embodiment and how light is reflected will be described hereunder comparing the present embodiment and the related art. The reflective prisms formed on the reflection surface of the Fresnel mirror section 4b are very small, and are thus not shown in FIG. 4. In addition, a lower section of the Fresnel mirror section 4b protrudes toward the transmissive screen 3 because the lower section of the Fresnel mirror section 4b is formed with a curved surface to be convex with respect to the direction of the transmissive screen 3.

In FIG. 4, the related art compared with the present embodiment takes, as an example, a reflection mirror that uses only a single planar mirror having a planar reflection surface. In the related art, outgoing image light from point "d" on a projection lens 2 (i.e., among all image portions at a lower end of a display surface of an image generation source 1, only the image light reaching a lower end of a transmissive screen) is bent at point "e" on the planar mirror (double-dot-dashed line section). Thereafter, the bent image light reaches point "g" on the transmissive screen 3. In the present embodiment, however, outgoing image light from point "d" on the projection lens 2 is reflected at point "f" on the Fresnel mirror section 4b and then reaches point "g" on the transmissive section 4b. As shown in FIG. 4, in the present embodiment, image light is projected onto the upper section of the set by the projection lens 2. This means that in the present embodiment, since the projection lens 2 is disposed upright to make an optical axis thereof closer to a vertical line segment, the height of a section below the transmissive screen 3 of the set (i.e., the height of a pedestal section) can be reduced, leading to reduced height of the set. However, if, in a configuration with the projection lens 2 disposed upright, image light from the projection lens 2 is reflected by one planar mirror as in the related art, a depth of the set increases since, as shown in FIG. 4, a lower end of the planar mirror protrudes toward the depth of the set. The present embodiment, however, allows the depth of the set to be reduced since the image light projected onto the lower section (approximately a lower half) of the transmissive screen 3 is reflected by the Fresnel mirror section 4b installed on the back of the enclosure 5 that is substantially parallel to a vertical direction. This means that the present embodiment, compared with the related art, can reduce the depth of the set by a size of the planar mirror needed to guide reflected image light to approximately a lower half of the transmissive screen 3. In the present embodiment, therefore, it is possible to reduce the depth of the set while at the same time reducing the height thereof, and thus to make the set more compact. As mentioned above, the image light projected onto the upper section (approximately an upper half) of the transmissive screen 3 is reflected by the planar mirror section 4a and guided to the upper section of the transmissive screen 3. Point C on the transmissive screen 3 is a center of the reflective prisms that are the concentric prisms formed on the Fresnel lens sheet (this center is hereinafter called Fresnel center C). Fresnel center C substantially aligns with the optical axis of the projection lens 2 to which the light, after being reflected by the planar mirror section 4a, is sent. Also, Fresnel center C is shifted upward with respect to a physical center of the transmissive screen 3.

Next, how light is reflected in a horizontal direction according to the present embodiment will be described below using FIG. 5. In FIG. 5, outgoing image light from point "d" on the projection lens 2 enters at point "e" on the planar mirror section (double-dot-dashed line section) at an angle of θa, is reflected at angle θa, and reaches point "g" on the transmissive screen 3. In the present embodiment, the image light going out from point "d" on the projection lens 2 is reflected at point "f" on the Fresnel mirror section 4b and then reaches point "g" on the transmissive screen 3. At this time, if the lower end of the Fresnel mirror section 4b does not have a convex shape and is planar, the image light going out from point "d" enters at point "f" at angle θa, is reflected at angle θa, and reaches point "g'" on the transmissive screen 3. For this reason, when viewed from the front of the set, the image will be slightly distorted at bottom. In order to prevent this phenomenon, the lower end B of the Fresnel mirror section 4b in the present embodiment has a curved shape so that the lower end B is convex with respect to the direction of the transmissive screen 3. Since the Fresnel mirror section 4b is formed into this shape, an incident angle of image light at point "f" on the Fresnel mirror section 4b can be made greater than when the lower end of the Fresnel mirror section 4b is formed into a planar shape. The image light incident on point "f" of the Fresnel mirror section 4b, therefore, can be guided to a horizontal end of the transmissive screen 3.

As described above, the present embodiment allows the set to be made even more compact since it uses a reflecting mirror split into the planar mirror section 4a for guiding image light to the upper section of the transmissive screen 3, and the Fresnel mirror section 4b for guiding the image light to the lower section of the transmissive screen 3.

In a vertical direction, compared with incident angle γ1 at which beams of light enter the transmissive screen 3 after being reflected only by a planar mirror as in the related art, incident angle γ2 at which beams enter the transmissive screen 3 after being reflected by the Fresnel mirror section 4b decreases as a particular incident position becomes more distant from Fresnel center C. That is to say, γ1 is greater than γ2, as can be seen from FIG. 4. Conversely, in a horizontal direction, compared with incident angle δ1 at which the beams enter after being reflected only by the planar mirror, incident angle δ2 at which the beams enter the transmissive screen 3 after being reflected by the Fresnel mirror section 4b increases as a particular incident position becomes more distant from Fresnel center C. That is to say, δ1 is smaller than δ2, as can be seen from FIG. 5. Accordingly, in the present embodiment, since the reflecting mirror includes not only a planar mirror section but also a Fresnel mirror section, the incident angles of the beams on the concentric Fresnel lenses formed on the transmissive screen 3 may differ according to the particular incident position, even within the same circumferential region. For instance, the incident angle of the beams entering a diagonal position within one circumferential region (the position where the beams intersect with a line segment which connects Fresnel center C and the four corners of the Fresnel lens sheet) may exceed the incident angle of the beams entering a vertical position (the position where the beams intersect with a perpendicular line passing through Fresnel center C). In such a case, it becomes difficult for the Fresnel lens sheet to make the incident beams go out as parallel beams (i.e., light substantially parallel to the optical axis of the Fresnel lenses). Consequently, part of the incident light exiting will be oriented too much with respect to the optical axis of the Fresnel lens sheet or oriented outward. Such events may degrade the quality of the image displayed on the transmissive screen 3. These events will be more significant with increases in the amount of shifting of Fresnel center C from the center of the transmissive screen 3. In the present embodiment, since the projection lens 2 is disposed upright as shown in FIG. 4, Fresnel center C needs to be shifted far upward with respect to the center of the transmissive screen.

In order to avoid these problems, the present invention makes prism angles of the concentric refractive lens (Fresnel lens) formed on the Fresnel lens sheet of the transmissive screen 3 differ within the same circumferential region. A configuration of the Fresnel lens sheet according to the present embodiment is described hereunder using FIGS. 6 and 7.

Figure 6:
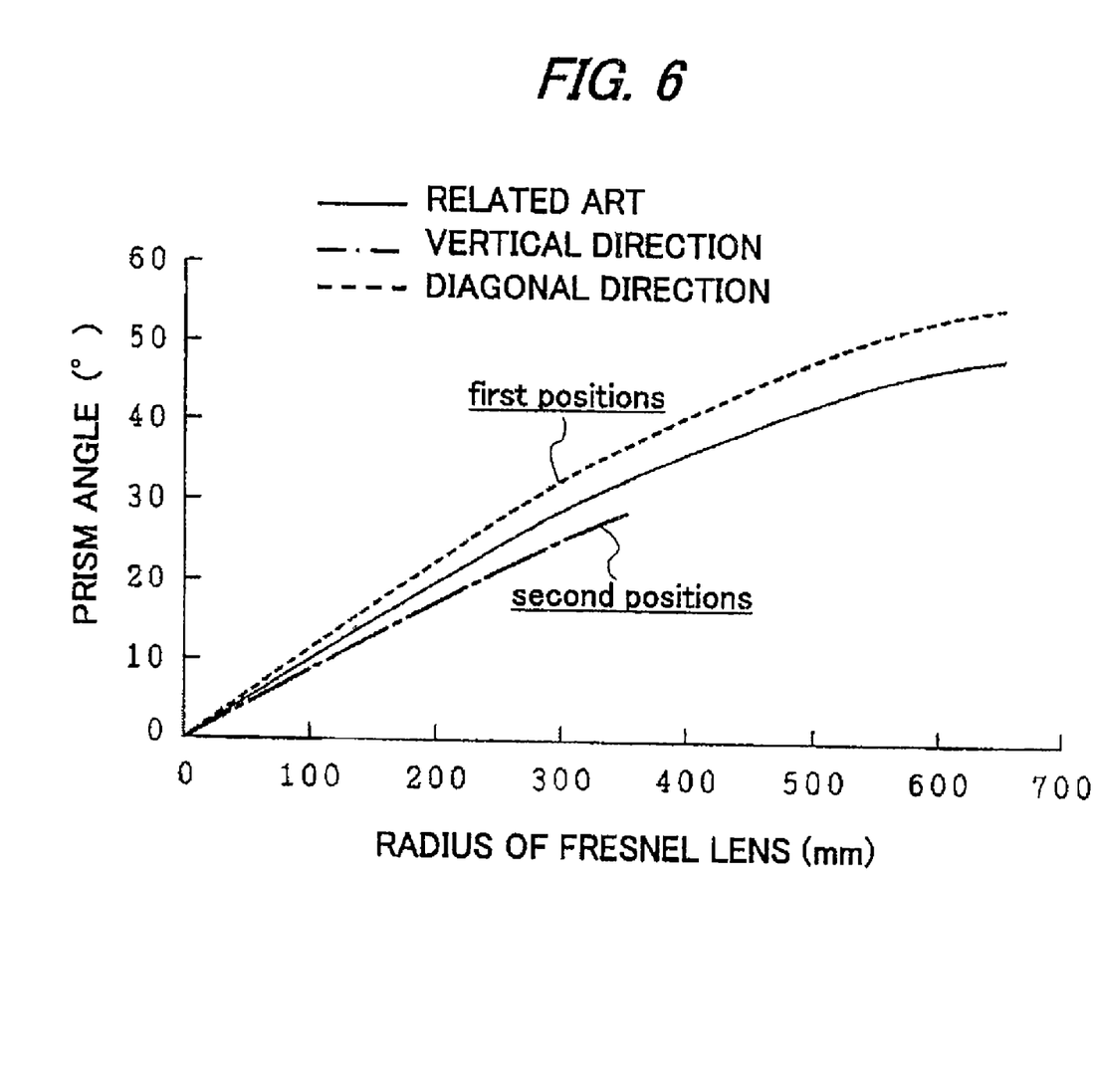
FIG. 6 is a graph showing an example of changes in the prism angle of a Fresnel lens with respect to the incident angle of beams on a transmissive screen according to the present invention.

First, changes in the prism angle of the Fresnel lens according to the present embodiment will be described below making comparisons with the changes seen in the related art. FIG. 6 is a graph showing an example of changes in the above prism angle with respect to the incident angle of beams on the transmissive screen of the present embodiment at an aspect ratio of 16:9 and a screen diagonal size of 50 inches. A horizontal axis of the graph represents a radius of the Fresnel lens (i.e., a distance from Fresnel center C), and a vertical axis represents the prism angle. The prism angle here is taken as the angle formed between a refraction surface (exit surface of light) of the prism constituting the Fresnel lens, and a principal plane of the Fresnel lens sheet 6. As shown with a solid line in FIG. 6, the prism angle of the Fresnel lens in the related art has been uniquely fixed with respect to the Fresnel radius, irrespective of direction (the position of the Fresnel lens). The prism angle of the Fresnel lens in the present embodiment changes in incident angle according to a particular position of the Fresnel lens, as mentioned above. For example, the Fresnel lens at a position where it intersects with a vertical line segment passing through Fresnel center C is smaller than in the related art in terms of vertical prism angle, as shown with a single-dot-dashed line in FIG. 6. Conversely, the Fresnel lens at a position where it intersects with a line segment which connects Fresnel center C and the four corners of the Fresnel lens is greater than in the related art in terms of diagonal prism angle, as shown with a broken line in FIG. 6. For example, Fresnel lenses within the same circumferential region of a 200-mm Fresnel radius have a vertical prism angle of about 17° and a diagonal prism angle of about 22°. In this way, in the present embodiment, the prism angle differs according to the particular position, even within the same circumferential region.

If a non-planar mirror is to be used as the reflecting mirror, the incident angle of beams differs according to the particular incident position of the beams on the Fresnel lens. (within the same circumferential region), as mentioned above. For this reason, if the Fresnel lens sheet used is such that as in the related art, the prism angle of the Fresnel lens within the same circumferential region is constant, image deterioration is likely to occur, as mentioned above. To ensure applicability to a configuration in which the incident angle of beams on the transmissive screen 3 changes within the same circumferential region, there is a need to form the entire Fresnel lens into a substantially elliptic shape with a fixed prism angle. Alternatively, the prism angle needs to be changed within the same circumferential region, with the Fresnel lens being kept circular. Since the former method is most likely to cause significant moiré disturbance, the latter method is employed in the present embodiment.

Figure 7:
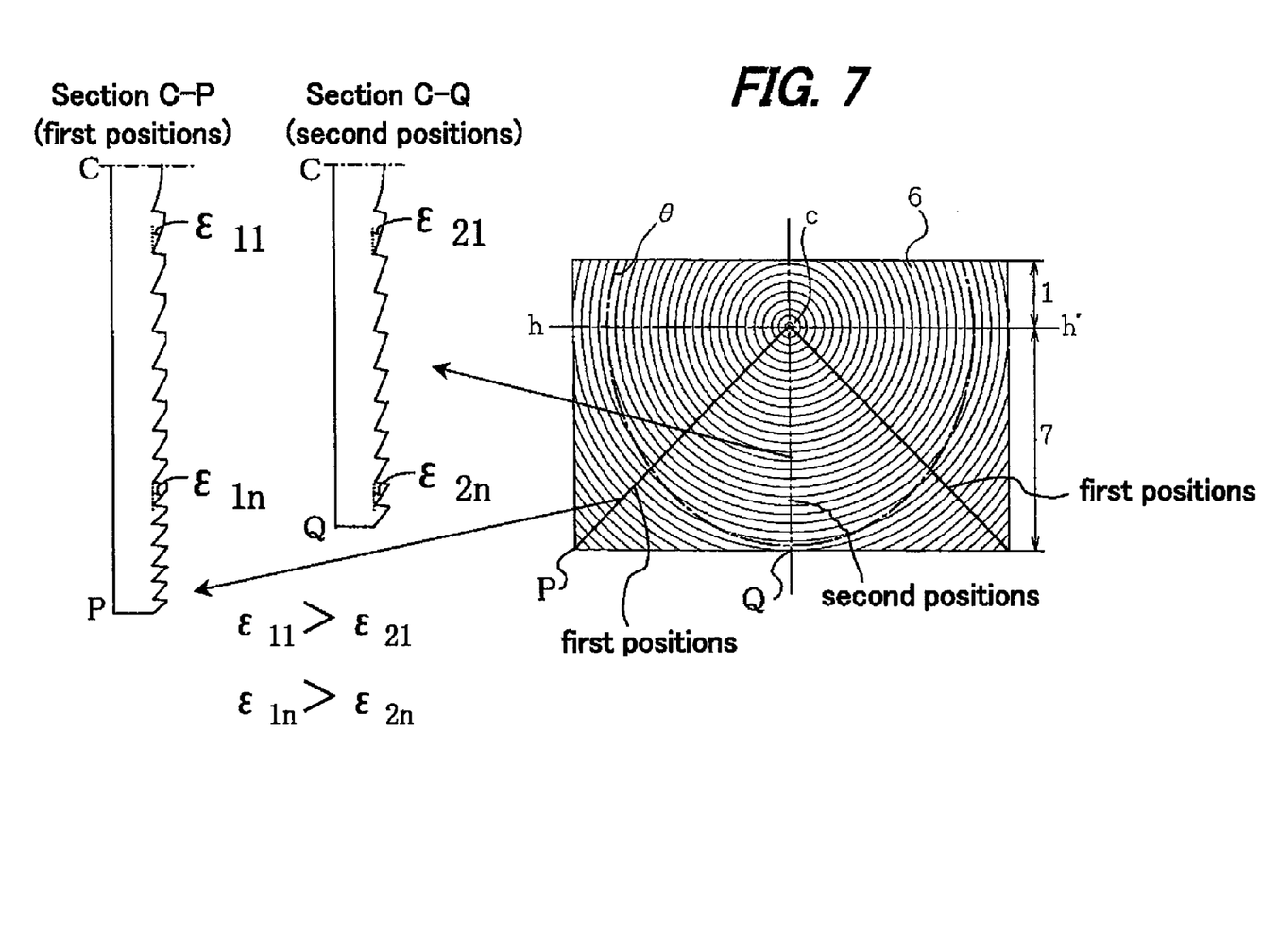
FIG. 7 is a diagram showing an example of a Fresnel lens sheet according to the present invention.

An example of a Fresnel lens sheet 6 according to the present embodiment is shown in FIG. 7. In FIG. 7, Fresnel center C is positioned at a rate of 1:7 in a vertical direction of the Fresnel lens sheet 6, and a single-dot-dashed line denotes a virtual reference line. This reference line is an equiangle line that denotes a prism angle of 25° as θ represented by the single-dot-dashed line. That is to say, the prism angle of a Fresnel lens that overlaps on the single-dot-dashed line is fixed at 25° (hereinafter, called the required angle). As is obvious from the figure, above horizontal line h-h' that includes Fresnel center C, the equiangle line lies on concentric circles of Fresnel center C, whereas, below h-h', the equiangular line is substantially elliptic. The prism angles of the Fresnel lenses positioned internally to the equiangle line are smaller than the required angle, and the prism angles of the Fresnel lenses positioned externally to the equiangle line are greater than the required angle. In other words, the present embodiment reduces refraction with respect to incident beams of light on the inside of the equiangle line, and increases refraction with respect to incident beams of light on the outside of the equiangle line.

There are various types of Fresnel lens sheets, such as an exit surface refraction type, an incident surface refraction type, an incident surface total reflection type, and a combination thereof. The Fresnel lens sheet 6 according to the present embodiment is of the exit surface refraction type, because its manufacture is simplified for the following reasons. In general, when Fresnel lenses are arranged at an equal pitch on a Fresnel lens sheet, changes in prism angle also change the prism in height. The height of the prism here refers to a distance in an optical-axis direction between a prism apex of the Fresnel lens and a principal plane of the Fresnel lens sheet (namely, in a direction of normal of the Fresnel lens sheet principal plane). If the prism angle is changed within the same circumference (pitch), the height of the prism must also be changed within the same pitch. This causes a significant bottleneck in manufacture of dies for the Fresnel lens sheet.

Figure 8A:
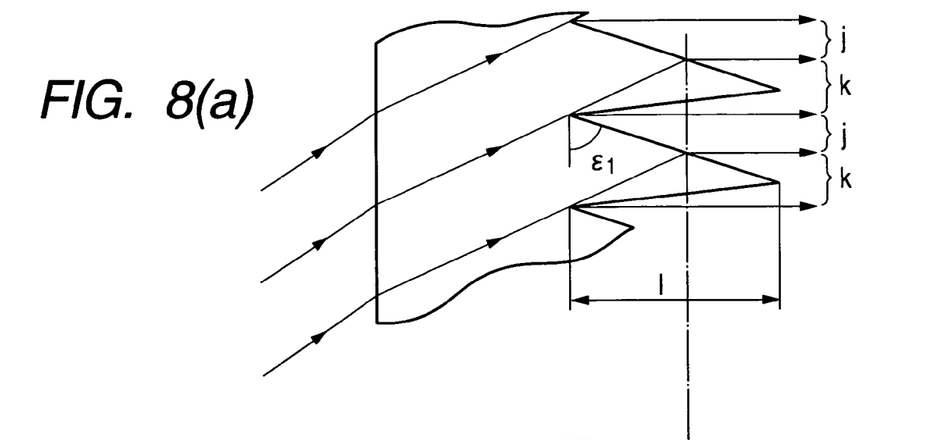
FIGS. 8A, 8B, 8C are views each-showing an example of a prism shape of the Fresnel lens according to the present invention.
Figure 8B:
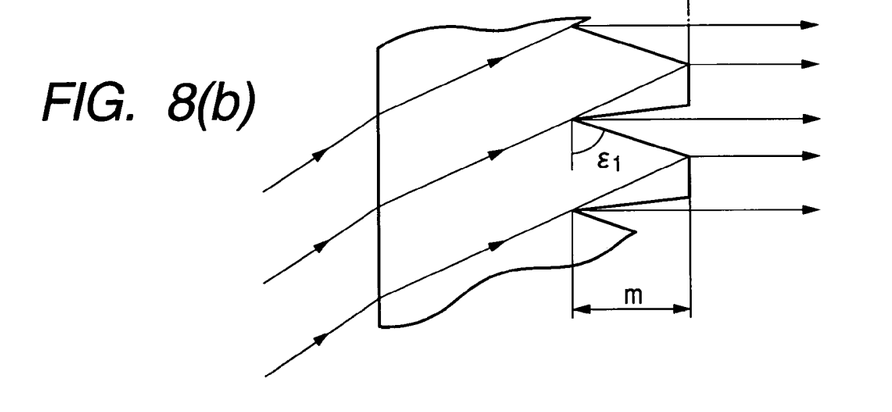
Figure 8C:
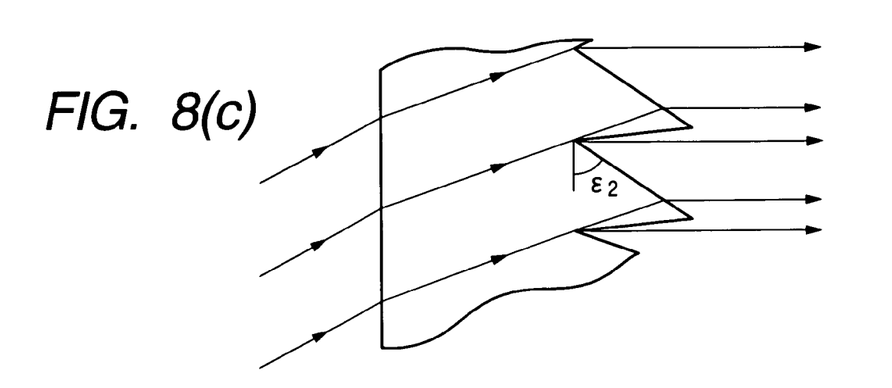

For the Fresnel lens sheet of the exit surface refraction type, as shown in FIG. 8A, an increase in the prism angle ($\epsilon 1$) correspondingly changes a rate between an exit portion (j-portion) and non-exit portion (k-portion), thus increasing a proportion of the non-exit portion (k-portion) as such. In this case, modifying the prism into a flat-ended one by cutting off an end of the original prism, as shown in FIG. 8B, does not pose any problems. That is to say, the height of the prism can be reduced from "1" to "m". As shown in FIG. 8B, modifying the prism into a flat-ended one by cutting off the end of the original prism makes it into the same height as that of a prism having a prism angle of $\epsilon 2$, as shown in FIG. 8C. Therefore, even if the prism angle is changed from $\epsilon 1$ to $\epsilon 2$ within the same pitch, during a manufacturing process for a die for the Fresnel lens sheet, it becomes unnecessary to change a cutting depth of the die. In the present embodiment, as shown in FIG. 6, the Fresnel lens with a maximum Fresnel radius also exhibits maximum changes in the prism angle within the same circumferential region. However, the differences in the prism angle are about 10°, and for the Fresnel lens sheet of the exit surface refraction type, the height of the prism does not need to be changed within the same circumferential region.

As described above, the present embodiment makes it possible to simultaneously realize reduction in height of the set and reduction in depth thereof. In the present embodiment, therefore, it is possible to reduce the depth of the set while at the same time reducing the height thereof, and thus to make the set more compact.

What is claimed is:

1. A screen onto which light from an image generation source is projected, said screen comprising:
    a Fresnel lens sheet with concentric prisms each formed at the image-viewing side;
    wherein centers of the concentric prisms are shifted from a center of said screen, and prism angles of the prisms change on the same circumference, and
    wherein, when a substantially elliptic reference line is placed on said Fresnel lens sheet, the prisms at positions where they overlap the reference line have substantially the same required prism angle.

2. The screen according to claim 1, wherein a center of the elliptic reference line is positioned in the centers of the prisms.

3. The screen according to claim 2, wherein a prism angle of each prism positioned internally to the elliptic reference line, and a prism angle of each prism positioned externally to the elliptic reference line differ from each other.

4. The screen according to claim 2, wherein the prism angle of each prism positioned internally to the elliptic reference line is smaller than the required prism angle, and the prism angle of each prism positioned externally to the elliptic reference line is greater than the required prism angle.

* * * * *